United States Patent [19]

Hukkanen

[11] 4,382,054

[45] May 3, 1983

[54] METHOD FOR PRODUCING DISPOSABLE TARGETS FOR SHOOTING SPORTS AND OTHER SIMILAR PURPOSES

[76] Inventor: Pentti Hukkanen, Oulu, Finland

[21] Appl. No.: 217,837

[22] Filed: Dec. 18, 1980

[30] Foreign Application Priority Data

Dec. 21, 1979 [FI] Finland .................................. 794018

[51] Int. Cl.$^3$ ................................................ C04B 7/34
[52] U.S. Cl. ...................................... 264/123; 264/333
[58] Field of Search ................. 264/333, 123; 106/110

[56] References Cited

U.S. PATENT DOCUMENTS

| | | | |
|---|---|---|---|
| 3,764,357 | 10/1973 | Bowles | 264/333 |
| 4,127,628 | 11/1978 | Uchida | 264/333 |
| 4,271,118 | 6/1981 | Schreiner-Hansen | 264/333 |

*Primary Examiner*—John A. Parrish
*Attorney, Agent, or Firm*—McGlew and Tuttle

[57] ABSTRACT

The method of the present invention is a method for producing disposable targets, for example so-called skeets, to be used in shooting sports and other similar purposes. The invention introduces a method for producing skeets made of a material which is firm and cheap and which doesn't cause health complication for men or animals or doesn't cause other damage when it spreads in nature during shooting competitions. These purposes are achieved by a process wherein a compound formed of gypsum containing crystal water ($CaSO_4.2H_2O$) with water and possibly other ingredients as impurities in smaller amounts, is mixed with another compound containing some highly water-binding substance, for example calk (CaO), as well as possibly other substances as impurities in smaller amounts, whereafter the resulting mixture is put under high pressure, for example $10kN/cm^2$, owing to which pressure the said mixture is instantaneously congealed.

8 Claims, No Drawings

METHOD FOR PRODUCING DISPOSABLE TARGETS FOR SHOOTING SPORTS AND OTHER SIMILAR PURPOSES

The object of the present invention is to provide a method for producing disposable targets, for example so-called skeet to be used in shooting sports and other similar purposes.

Skeet are disc-like or plate-like objects made of an easily breakable material. They are hurled into the air by a catapult and serve as moving targets for sport marksmen and hunters. Their principal measurements and weight are internationally established. The requirements placed on their material quality are rather strict, because the skeet should not break during transportation or in the catapult, but should be shattered into tiny pieces immediately after being hit by one shot.

By employing the method of the present invention, it has become profitable to produce disposable targets for biathlon competition.

The Finnish Patent Publication No. 46 208 presents a method for producing skeet, which method uses a mixture of a pitchy substance and a filler. The mixture is melted by conducting heat into it, after which it is pressed into coolable moulds. The mixture consists mainly of equal parts of coal-tar pitch, the softening point of which is 85°–90° C., and calcium carbonate. At the present this is the most common method for the production of skeets.

The use of coal-tar pitch, however, brings forth a serious disadvantage. It has been proven that the dust which is created when the sheet are broken by shots, causes damage to the surrounding nature. The grazing and wild animals in the area may consume it in their food, which may lead to the breaking out of diseases. This is due to the fact that coal-tar pitch contains large amounts of so-called polycondensated aromatic hydrocarbons, among others the 3,4-benzopyrene, which is known to cause cancer.

The Swedish Patent Publication No. 760 4126 - 8 introduces a method which, in order to minimize the above mentioned drawbacks, employs as binding materials such aromatic paraffin resins where the atomic proportion between carbon and hydrogen is 0.8 or greater and the average molecular weight is over 1500, with the boiling point thereof being at least 300° under normal pressure.

The German Patent Publication No. 2 627 695 (U.S. Pat. No. 4,124,550) introduces a method for producing skeet made of thermoplastic synthetic resins, paraffin resins, terpene resins, polyterpene resins, xylol resins or polystyrol, as well as of materials derived from the above, together wwith a powder-like filler.

The dust which is created while the above mentioned, resin-based skeet are broken, is unsanitary. It is noted that during only one shooting competition, thousands of skeet are broken into pieces. It is thus natural that sanitary aspects should be taken into account. It has for example been proven that the breathing of bakelite dust causes lung damage. Similarly, polycyclic hydrocarbons, asphalt, bitumen-based oils and mineral oils can cause skin cancer.

Another drawbacks concerning the production of the two last mentioned inventions is the fact that their raw materials are oil-based and, as such use rather highly refined products. Because the oil supplies in the world are limited, it is not globally advantageous that such products are used for a purpose where they can be replaced by other suitable and remarkably cheaper materials. The said oil-based materials are organic substances and as such they cause similar health complications as the above mentioned materials containing coal-tar pitch.

According to the Swiss Pat. No. 541 796 it is known in the prior art to fabricate hollow, thin-walled targets, on the spot, by freezing water. The advantages of so manufactured targets are the cheapness and polluted nature of the raw material (=water). This process, however, requires a lot of energy and a complex machinery, because in skeet-shooting competition each shooting range needs 1–2 targets/10 seconds, and there may be several ranges simultaneously in use.

Moreover, it is not possible to fabricate ice skeets that conform to the norms of the UIT (Union Internationale de Tir), because in addition to the measures and weights of the skeet these norms also include accurate definitions concerning their color etc.

SUMMARY OF THE INVENTION

The several drawbacks mentioned above can be eliminated by employing the skeet manufacturing method according to the present invention.

An object of the present invention is to provide a method for producing disposable targets comprising making a mixture of a gypsum containing crystal water, water and another compound containing highly water-binding substance, and placing the resulting mixture under pressure to produce the targets which instantaneously congeal.

By employing the present invention, several advantages are achieved in comparison with the currently known methods. When using the current method in manufacturing the skeet, the skeet shrink while they are cooled in the mould, and consequently tensions are created within them. The skeet according to the present invention has better durability qualities than skeet produced according to other methods, as regards their hurling and transportation, because the skeet of the present invention do not have such tensions as could increases their tendency to break. However, when hit by a shot they are shattered into tiny pieces. It has been experimentally proven that the skeet durability qualities can be adjusted by modifying the pressing power and mixture proportions.

While employing the present invention, the splinters of the broken skeets involve no danger to the surrounding nature, and they can be used for example as soil conditioners, because they contain no organic substances nor heavy metals. They cause a basic reaction in the soil, thus decreasing the acidness of the soil. If the material of the skeet of the invention is sludged into water following the proportions 1 part solids, 9 parts water, the pH-value of the resulting sludge is over 12.

Moreover, it is a great economical advantage that the skeet of the invention can be manufactured of waste gypsum resulting from the process of phosphoric acid factories, as well as of ashes created while burning the sulphite waste lye from a pulp factory.

DESCRIPTION OF THE PREFERRED EMBODIMENT

In the following the invention is explained in detail, in light of one example. For producing skeet, a mixture is prepared which contains 70% side-product gypsum and 30% ashes created in the process of burning sulphite waste lye and the rind of trees.

EXAMPLE OF THE RAW MATERIAL ANALYSIS

| Side-product gypsum | $H_2O$ | roughly 40% |
|---|---|---|
| | $H_2SO_4$ | 2.1 |
| | $PO_4$ | 2.1 |
| | Ca | 15.6 |
| | S | 12.6 |
| Sulphite ashes | CaO | 64.5% |
| | S | 10.5 |
| | $CO_2$ | 19.5 |
| | MgO | 1.55 |
| | $K_2O$ | 2.1 |

The essential ingredients from the point of view of the invention are the $CaSO_4.2H_2O$ of the side-product gypsum, the "excess" water of the gypsum and the CaO of the sulphite ashes or the compound containing highly water-binding substances. The proportional amount of crystal water is roughly 20%, so that roughly 20% of the water is unbound within the mixture. Other ingredients have no direct influence regarding the durability of the product. However, it can be stated that the other alcalic ingredients of the sulphite ashes neutralize the acidic elements of the gypsum, so that the resulting material can be used for example as a soil conditioner.

According to the invention the two compounds, the gypsum and the sulphite ashes, e.g. after being separately milled, are mixed in powder form. The mixture is pressed into the mold. Owing to the pressure and above all the reactions that take place during the pressing, the mixture is instantaneously congealed. The congealment takes place almost instantly, but requires adequate pressing power. For example an eccentric press is recommendable for the purpose. The successful application of the method presupposes that a sufficiently high pressure can be created. In laboratory circumstances sample skeet have been manufactured, the diameter of which skeets is 40 cm, by employing 40 tons of pressure. The pressure of 10 $kN/cm^2$ is an exemplary value. The main reaction during the pressing is the following: the excess water within the gypsum reacts with the calcium oxide contained in the ashes, and the result is a solid object. The skeet, which is cast in the mold and pressed, is now ready to be painted. According to the current method the skeet are dried after pressing. In the present invention this drying phase is unnecessary, and the skeet can be painted immediately.

While specific embodiments of the invention have been shown and described in detail to illustrate the application of the principles of the invention, it will be understood that the invention may be embodied otherwise without departing from such principles.

I claim:

1. Method for producing a disposable target, usable in shooting sports comprising the steps of mixing $CaSO_4.2H_2O$ and a CaO containing substance in the form of a second powder to provide a powder mixture thereof, and thereafter subjecting the powder mixture to sufficiently high molding pressure for substantially instantaneously congealing the mixture to solid form to provide such target.

2. Method according to claim 1, wherein the two powders are separately milled before they are mixed together.

3. Method according to claim 1, wherein the mixture is subjected to such molding pressure by being pressed, employing an eccentric press, into a mold which has the shape of the final product.

4. Method according to claim 1, wherein the pressure exerted on the mixture is about 10 $kN/cm^2$.

5. Method according to claim 1, comprising mixing about 70% of the first powder with about 30% of the second powder.

6. Method according to claim 1, wherein the second powder comprises sulphite ash.

7. Method according to claim 1, wherein the first powder comprises side product gypsum.

8. Method according to claim 1, wherein the first powder comprises side product gypsum, and the second powder comprises sulphite ash from a process of burning sulphite waste lye and the rind of trees, the mixture containing about 70% side product gypsum and about 30% sulphite ash and including excess unbound water in an amount of roughly about 20% based on the $CaSO_4.2H_2O$ content.

* * * * *